United States Patent
Horng

(10) Patent No.: US 6,762,527 B1
(45) Date of Patent: Jul. 13, 2004

(54) DC BRUSHLESS MOTOR

(76) Inventor: Yea Huey Horng, No 20-16, Nan Pei 4 Road, Ta Chia Chen, Taichung Hsien (TW)

( * ) Notice: Subject to any disclaimer, the term of this patent is extended or adjusted under 35 U.S.C. 154(b) by 0 days.

(21) Appl. No.: 10/464,438

(22) Filed: Jun. 19, 2003

(51) Int. Cl.[7] .............................................. H02K 1/28
(52) U.S. Cl. ........................... 310/156.18; 310/40 MM; 310/267; 310/90; 384/453
(58) Field of Search ...................... 310/156.01, 156.08, 310/156.21, 156.22, 156.18, 90, 268, 156; 384/453

(56) References Cited

U.S. PATENT DOCUMENTS

| | | | | |
|---|---|---|---|---|
| 2,436,768 A | * | 2/1948 | Arnold et al. ............... | 384/453 |
| 3,484,635 A | * | 12/1969 | MacKallor ............. | 310/156.18 |
| 4,060,745 A | * | 11/1977 | Linscott, Jr. ........... | 310/156.22 |
| 4,211,963 A | * | 7/1980 | Muller ....................... | 310/268 |
| 4,260,920 A | * | 4/1981 | Nakamura et al. ...... | 310/156.05 |
| 4,902,923 A | * | 2/1990 | Okauchi ..................... | 310/268 |
| 5,436,518 A | * | 7/1995 | Kawai ................... | 310/156.18 |
| 6,347,929 B1 | * | 2/2002 | Cooper et al. ........... | 417/423.7 |

* cited by examiner

*Primary Examiner*—Burton S. Mullins
*Assistant Examiner*—Yahveh Comas

(57) ABSTRACT

A DC brushless motor comprises a stator; a casing; a rotor and a cover. The magnet and the enhancing plate are locked by studs other than using glue agent. A block on the lower surface of the enhancing plate is embedded into a central hole of the magnet so as to support the magnet and cause that the rotary shaft will not con tact the magnet directly. A cover is extended with an inner sleeve. A groove seat is installed with a lower bearing and the inner sleeve is installed with a middle bearing and an upper bearing. The bearings are installed with respective enhancing pads. The rotary shaft of the rotor is installed with an annular enhancing flange and an annular inner flange which resist against the upper bearing. The inner flange resists against the enhancing pads of the middle bearing.

2 Claims, 4 Drawing Sheets

DC BRUSHLESS MOTOR

FIELD OF THE INVENTION

The present invention relates to motors, and particularly to a DC brushless motor with strong structure so that rotary shaft of the rotor can be firmly secured.

BACKGROUND OF THE INVENTION

In the prior art, the DC (direct current) brushless motor is vertically arranged. Referring to FIG. 1, a prior art brushless motor is illustrated, where the motor includes a stator 10, a rotary shaft 21, cover 13, a casing 14 having a ventilating groove 140, and a fan 3. The stator 30 is formed by silicon steel sheets 11 and coils which are disposed in the cover 13. The rotor 20 is formed by a rotary shaft 21, a disk magnet 23 and an enhancing plate 25 having ventilating grooves 24, 26. The cover 13 has a groove seat 330. The seat has an axial hole. A bearing 15 is installed in the groove for assembling the rotary shaft 41. The casing 14 has a bearing 15 for locating the rotary shaft 21. The fan 3 is installed to the casing 14 at an upper end of the rotary shaft 21. However, above mentioned prior art has the following defects.

Only one bearing 15 is used to combine the rotary shaft 21 of the rotor 20 to the cover 13, so that ail the weight of the rotary shaft 21 is applied to the bearing 15. Thus the lifetime of the bearing is short and thus the bearing 15 is updated frequently. Moreover, the rotary shaft 21 easily shifts so as to generate noise.

Moreover, the enhancing plate 25 of the rotor 20 is combined to the magnet 23 in a plane configuration by glue agent. If the glue agent is deteriorated, the combination will become loose. Furthermore, the fan is made by plastically injection molding and then the fan is locked to the rotary shaft 21. Since plastic is soft, as the fan rotates with a higher speed, a large noise generates. Moreover, a gap is formed between the fan 3 the magnet 23 and the enhancing plate 25. No vortex generates on the enhancing plate 25. As a result, the air ventilation is low and heat dissipating is not preferred.

SUMMARY OF THE INVENTION

Accordingly, the primary object of the present invention is to provide a DC brushless motor which comprises a stator; a casing; a rotor formed by an enhancing plate, a magnet and a rotary shaft. The magnet and the enhancing plate are locked by studs other than using glue agent. A block on the lower surface of the enhancing plate is embedded into a central hole of the magnet so as to support the magnet and cause that the rotary shaft will not contact the magnet directly. A cover is extended with an inner sleeve. A groove seat is installed with a lower bearing and the inner sleeve is installed with a middle bearing and an upper bearing. The bearings are installed with respective enhancing pads. The rotary shaft of the rotor is installed with an annular enhancing flange and an annular inner flange which resist against the upper bearing. The inner flange resists against the enhancing pads of the middle bearing.

The various objects and advantages of the present invention will be more readily understood from the following detailed description when read in conjunction with the appended drawing.

BRIEF DESCRIPTION OF THE DRAWINGS

FIG. 3a is a bottom view of the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present Invention, but not to be used to confine the scope and spirit of the present invention defined in the appended claims.

Figure 1:
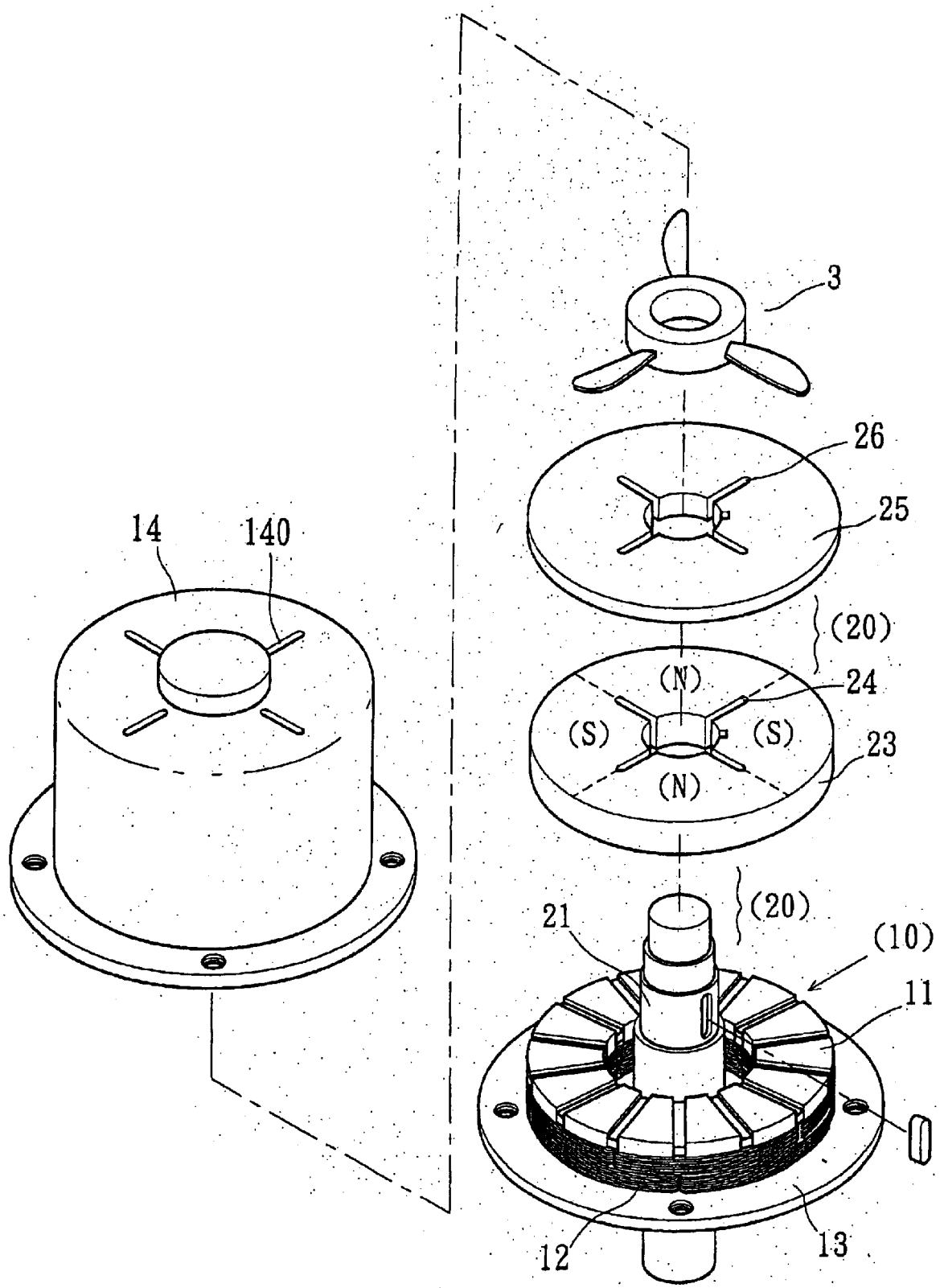
FIG. 1 is an exploded perspective view of the prior art.
Figure 2:
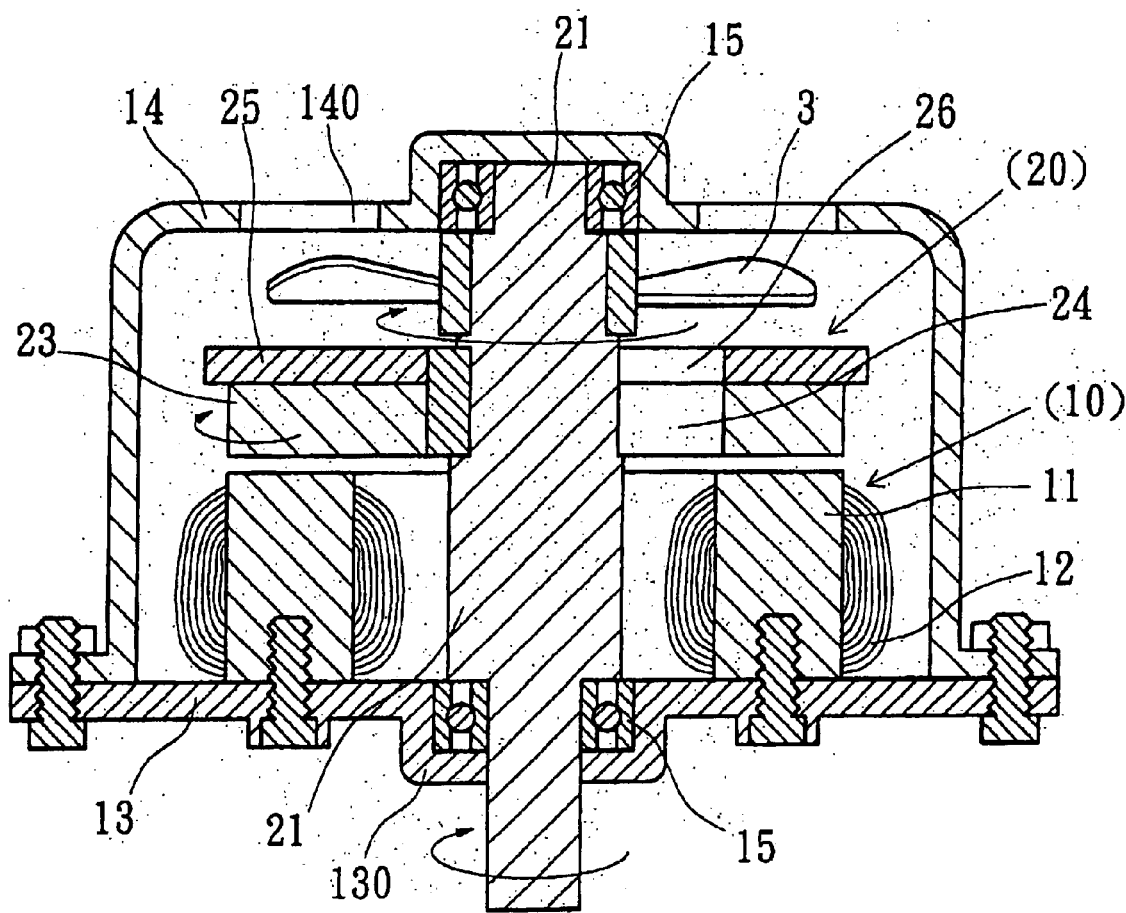
FIG. 2 is an assembled cross sectional view of the prior art.
Figure 3:
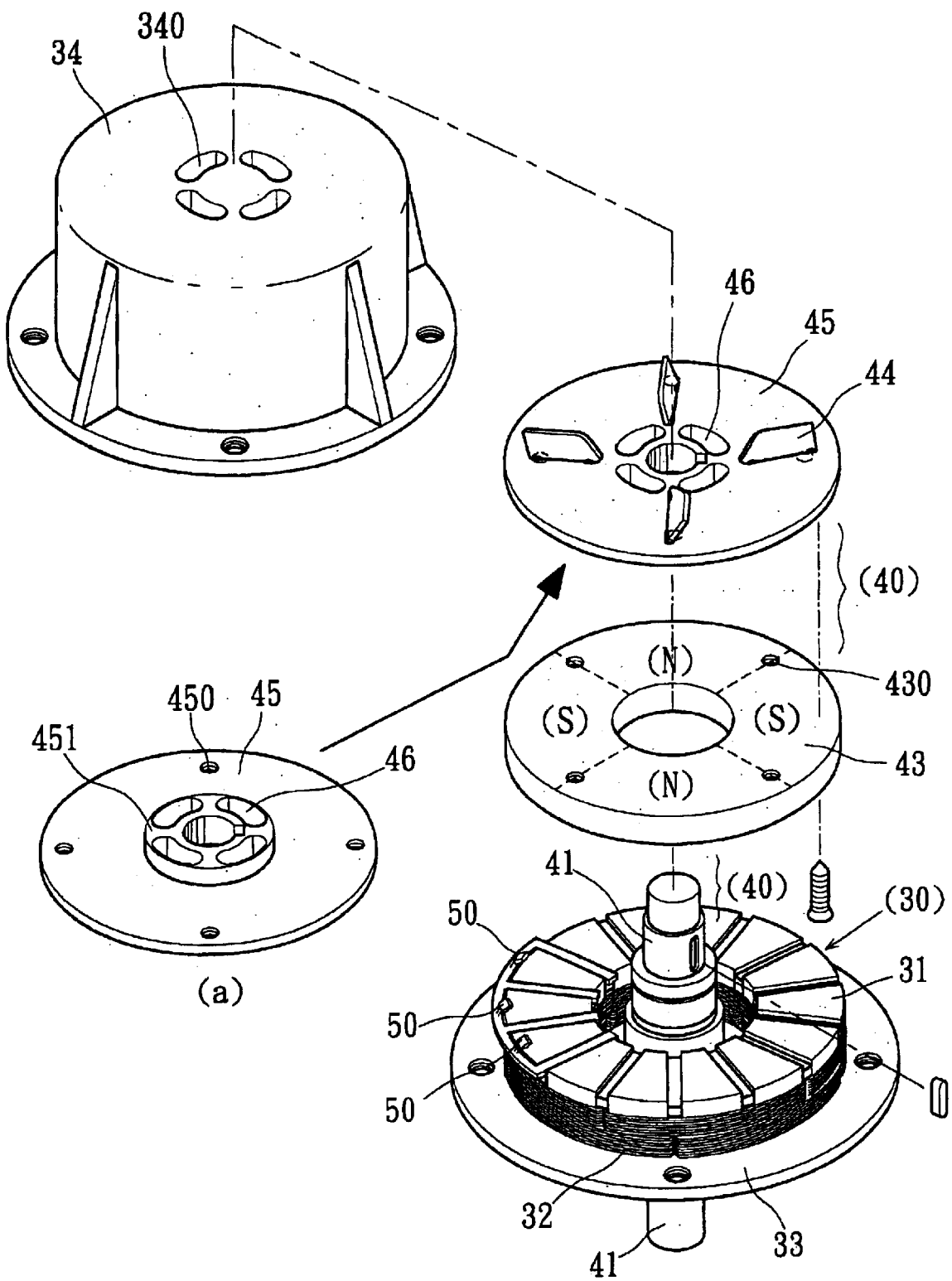
FIG. 3 is an exploded perspective view of the present invention.
Figure 4:
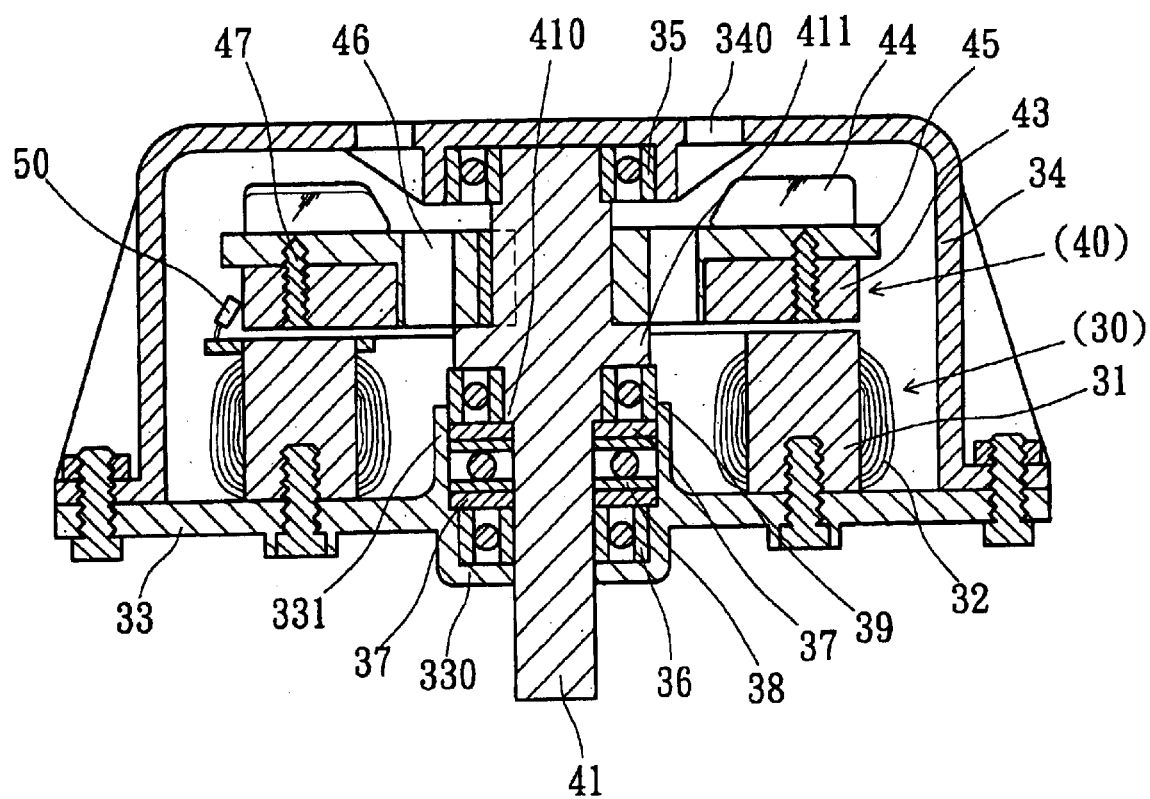
FIG. 4 shows the structural cross sectional view of the present invention.

Referring to FIGS. 3 and 4, the present invention includes a stator 30 formed by silicon steel sheets 31 and coils 32, a rotor 40 formed by an enhancing plate 45, a magnet 43 and a rotary shaft 41, and a cover 33 having a groove seat 330 and a casing 34 having a plurality of ventilation holes 340.

The magnet 43 has a plurality of via holes 430, and the enhancing plate 45 has a plurality of screw holes 450 corresponding to the via holes 430 of the magnet 43 so that the magnet 43 and the enhancing plate 45 can be locked by studs 47 other than using glue agent. A lower surface of the enhancing plate 45 has a block 451 integrally formed on the enhancing plate 45. The block 451 can be embedded into a central hole of the magnet 43 so as to support the magnet 43 and cause that the rotary shaft 41 will not contact the magnet 43 directly. Thereby, the magnet 43 is protected. Moreover, a plurality of blades 44 are welded on an upper surface of the enhancing plate 45. When the enhancing plate 45 rotates, the blades 44 rotate therewith so that the enhancing plate 45 generates a vortex of airflow. Thereby, mote hot air can be driven out so as to have a preferred heat dissipating effect.

The groove seat 330 of the cover 33 is extended with an inner sleeve 331. A groove seat 330 is installed with a lower bearing 36 and the inner sleeve 331 is installed with a middle bearing 38 and an upper bearing 39. The lower bearing 36, middle bearing 38, and upper bearing 39 are installed with respective enhancing pads 37. The rotary shaft 41 of the rotor 40 is installed with an annular enhancing flange 411 and an annular inner flange 410 which resist against the upper bearing 39. The inner flange 410 resists against the enhancing pads 37 of the middle bearing 38.

The stator 30 is installed with a polarity detector 50 which is connected to the coil 32 of the stator 30 for detecting the polarity of the magnet 43 of the rotor 40 so that the polarity of the coil 32 of the stator 30 is correspondent to the same polarity of the rotor 40. By the polarity detector 50, the polarities of the rotor 40 and stator 30 can be aligned rapidly.

The N and S polarities of the magnet 43 of the rotor 40 are preset in advance.

The coils 32 of the stator 30 have a multiple layer structure so as to enclose the rotor 40 and thus the polarities of the coils 32 are same as the rotor 40.

In the present invention, one end of the rotary shaft 41 of the rotor 40 is assembled to the stator 30 and then is assembled to the inner sleeve 331 and groove seat 330 of the cover 33. Then they are placed within the casing 34 and retained therein by studs so as to form a motor. The magnetic surface of the magnet 43 of the rotor 40 faces the silicon steel sheets 31 and coils 32 of the stator 30. Thereby, the rotary shaft 41 is vertically arranged.

The operation of the present invention will be described herein. When the coils 32 of the stator 30 is conducted, the polarity detector 50 can determine the polarity of the corresponding rotor 40 so that the coil of the stator 30 can have the same polarity (N or S). Thereby, the magnetic force lines will drive the magnet 43 so that the rotary shaft 41 of the rotor 40 rotates. That is, the rotary shaft 41 of the rotor 40 rotates by the change of the polarity of the magnetic field.

The advantages of the present invention will be described herein.

The cover 30 of the present invention suffers from the weight and rotation of the cover 33. The cover 30 of the present invention has the groove seat 330 and inner sleeve 331. A lower bearing 36, two enhancing pads 37, magnet 43 and upper bearing 39 are formed with a firm structure so that all the bearings are steadily positioned.

The annular enhancing flange 411 and inner flange 410 will firm secure the rotary shaft 41 of the rotor 40 to the bearings. That is to say the weight and rotation stress of the rotor 40 are distributed on the annular enhancing flange 411 and the inner flange 410 so that the rotary shaft 41 has a longer lifetime. In detail, the lower bearing 36 and upper bearing 39 will retain the position of the rotary shaft 41 and the magnet 43 causes that the rotation of the rotary shaft 41 is smooth. The enhancing pads 37 can suffer the weight of the bearings so as to enhance the tolerance of the bearings.

The inner sleeve 331 has the effect of confining the rotary shaft 41 by prolong the length of the inner sleeve 331 so that the rotary shaft 41 can be steadily supported. As a result, the noise is reduced and the rotary shaft 41 can rotate smoothly.

Other than using glue agent, in the present invention, by the studs 47 to screw into the via holes 430 and screw hole 450, the magnet 43 and the enhancing plate 45 are combined. Thus, the combination of the two are firmly.

Moreover, the present invention has a preferred heat dissipating effect and generates a low noise. The blades 44 of the present invention are directly welded to the enhancing plate 45. That is, the outer lateral sides of the enhancing plate 45 have blades 44. When the enhancing plate 45 rotates in a high speed, the blades 44 rotate therewith. Since the blades 44 are distributed on the enhancing plate 45, a vortex is generated along the outer lateral side of the enhancing plate 45. Thereby, the vortex can reduce the temperature of the stator 30 through the via holes 46, Heat can be drained out from the through hole 340 of the casing 34. Moreover, the blades 44 are directly welded to the enhancing plate 45 and thus noise is reduced.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A DC brushless motor comprising:

a stator;

a casing;

a rotor formed by an enhancing plate, a magnet and a rotary shaft; the magnet having a plurality of via holes, and the enhancing plate having a plurality of screw holes corresponding to the via holes of the magnet so that the magnet and the enhancing plate being locked by studs other than using glue agent; a lower surface of the enhancing plate having a block integrally formed on the enhancing plate; the block being embedded into a central hole of the magnet so as to support the magnet and cause that the rotary shaft will not contact the magnet directly; and thereby, the magnet being protected;

a cover extended with an inner sleeve; a groove seat being installed with a lower bearing and the inner sleeve being installed with a middle bearing and an upper bearing; the lower bearing, middle bearing, and upper bearing being installed with respective enhancing pads at a lower side of the respective lower, middle and upper bearings; the rotary shaft of the rotor being installed with an annular enhancing flange and an annular inner flange which resist against the upper bearing; the inner flange being in contact with the enhancing pads of the middle bearing.

2. The DC brushless motor as claimed in claim 1, wherein a plurality of blades are welded on an upper surface of the enhancing plate; when the enhancing plate rotates, the blades rotates therewith so that the enhancing plate generate a vortex of airflow.

* * * * *